Patented Nov. 10, 1953

2,658,814

UNITED STATES PATENT OFFICE 2,658,814

METHOD OF PRODUCING ACTIVE MAGNESIUM OXIDE

Teynham Woodward, Los Altos, Calif., assignor to Food Machinery and Chemical Corporation, New York, N. Y., a corporation of Delaware No Drawing. Application November 24, 1948, Serial No. 61,919

8 Claims. (Cl. 23—201)

This invention relates to novel active magnesias of improved properties and to their production from precipitated magnesium hydroxides, as those obtained by alkaline precipitation from magnesium brines. More particularly it is concerned with magnesias of magnesium oxychloride cement grade produced from precipitated magnesium hydroxide such as that precipitated from sea water or concentrated bitterns remaining after crystallization or partial crystallization of the sodium chloride content of sea water.

Up to the time of the present invention, the magnesia commercially produced for and used in magnesium oxychloride cement has been produced from magnesite. The supply of this ore is limited and is known to be dwindling. During recent years, however, magnesium hydroxide from sea water has become available in substantial amounts and is potentially obtainable in unlimited amounts. The magnesium content is recovered as magnesium hydroxide from the sea water or sea water bittern by any of a number of precipitation processes. This magnesium oxide produced from precipitated magnesium hydroxide is not satisfactory for use in magnesium oxychloride cements because of excessive contraction during setting and the poor workability of the cement mixes.

An object of the present invention is to provide magnesias from precipitated magnesium hydroxide derived from sea water or sea water bittern, which are comparable if not superior in magnesium oxychloride cementations to magnesias produced from magnesite.

Broadly considered, the invention involves medium burning or hard burning precipitated magnesium hydroxide, hydrating the burned product obtained and light burning the resulting mass to produce active magnesia. Through this procedure, magnesias of magnesium oxychloride cement grade are obtained.

When the precipitated magnesium hydroxide is subjected to a conventional burning procedure, the resulting magnesias are unsatisfactory for use in the said cements due to a number of factors. If light burning alone is employed, the magnesia obtained may be sufficiently active, but in cement mixes, its use leads to excessive non-plastic contraction of the magnitude of 0.2 to 0.3%. Such light burned products have a low bulk density, ordinarily of from 25 to 35 pounds per cu. ft. in powdered condition (i. e., only about 5% greater than 200 mesh). If either medium burning or hard burning is employed alone, the resulting magnesia of greater or higher bulk density is unsatisfactory for the production of magnesium oxychloride cements due to lack of sufficient activity.

By the double burning procedure of the present invention, including the intermediate hydration step, magnesias of increased bulk density are obtained having low contraction properties. The bulk densities of these products in like ground condition are from about 38 to 64 pounds per cu ft., or higher and their nonplastic linear contraction (the critical period between final set and maximum contraction where stresses set up by contraction are not readily relieved), is always less than 0.15% and generally is less than 0.10% in a standard 1:2:5 oxychloride formulation hereinafter described.

Field tests of the said oxides reveal that they are not only acceptable as to these properties, but that they possess a number of additional advantages over magnesia produced from magnesite, including improvement in color, strength and uniformity.

For understanding the present invention there is set out hereinbelow the nature of the respective burning operations contemplated or employed therein. In all calcining treatments for the production of burned magnesias, the degree of burning and properties of the product are determined by the temperature-time relationship.

The initial burning step of the present invention applied to the precipitated magnesium hydroxide is a medium burning or a hard burning or of any degree therebetween. In the interest of conciseness, it is referred to hereinafter as a "medium to hard burning." This medium to hard burning is carried out at temperatures ordinarily well above about 1200° C. While in the kiln, the material is subjected to such temperature at least until sintering has commenced. Very tiny periclase crystals can be observed therein, under the optical microscope. A great many of the colloidal particles of magnesia or crystallites have coalesced and fused together to form the small crystals.

In this initial burning step, temperatures of 1200° to 1400° C. are preferably employed. The medium burned products of this step reveal insufficient activity for magnesium oxychloride cementations, the said activity as indicated by iodine numbers in a standardized test being substantially zero or not more than 2 or 3. This test is defined in an article by Albert C. Zettlemoyer and William C. Walker in Industrial Engineering Chemistry, issue of January 1947, volume 39, page 69.

Hard burning of precipitated magnesium hydroxide may be said to result from burning under any conditions more severe than those employed in the production of the medium burned product. Hot zone temperatures in rotary kiln operations for the production of such magnesia range up to as high as 1800° C. Through this heat treatment well-formed periclase crystals in individual grain particles are obtained. Incidentally, these crystals are largely or completely surrounded any matrix impurities present, such as lime, silica, alumina, etc.

To provide the most desirable properties in the final light burned product, the medium to hard burning initial step is carried out under conditions producing a sintered magnesia having a bulk density in excess of about 50 pounds per cu. ft. As between the medium burned and the hard burned magnesia, the former is preferred, for it is more easily and quickly hydrated in the next step.

This hydration step may theoretically be carried out in the presence of water, vapor or steam under any conditions. Experimentation, however, has led to the discovery that the hydration may be accomplished in a period of only a few hours by conducting the same at a high temperature under pressure of steam. For example, substantially complete hydration of a medium burned product may be effected at 170° C. under a steam pressure of 105 to 125 p. s. i. in a period of about four hours. Hydration may also be accomplished at lower temperatures as at 120° C. but the time required for substantially complete hydration is 26 hours. The hydration treatment may be satisfactorily carried out either in a batch or a continuous process.

It is not essential to the success of the process that complete hydration of the burned magnesia be accomplished. Eighty-three per cent hydration of a medium burned magnesia submerged in water may be accomplished at 90° C. in a period of about 660 hours. The rate and extent of hydration may be facilitated by preliminarily grinding the burned magnesia. If this step is employed, then 91 per cent hydration of the above medium burned magnesia may be accomplished in only 255 hours at the 90° C. temperature.

The second burning step may be carried out under known light burning conditions designed for the production of active magnesia for use in magnesium oxychloride cement to meet the standards of the Oxychloride Cement Association. Generally considered, this light burning operation may be said to involve the calcination of magnesium hydroxide under conditions substantially completely removing the water of hydration of the magnesium hydroxide without bringing about measurable or appreciable sintering of the crystallites which make up the fine structure of the magnesia.

Under properly controlled conditions of atmosphere and time, a light burned product of required properties is obtainable at temperatures as low as 400° C. or as high as perhaps 1000° C. In a normal rotary kiln operation, temperatures will not ordinarily be used other than those of from 600° to 900° C., a preferred maximum being 700° to 800° C. The exact time-temperature relationship must be carefully regulated, however, in order to obtain magnesia of optimum iodine number (ordinarily from 17 to 23) and of other desired properties for cement production.

The products of the present invention may be defined as oxychloride grade magnesias pseudomorphic of magnesium hydroxide having iodine numbers within the range of 8 to 25, magnesium hydroxide contents of from 1.5 to 30%, and exhibiting nonplastic linear contractions of less than about 0.15% in a standard oxychloride cement formulation. The contraction test is conducted by molding a cement from a mix composed of approximately one part of the magnesia herein defined, two parts silex, and five parts testing sand gauged with magnesium chloride solution. The contraction of the bar from ½ hour after final set to maximum contraction is determined by the use of a micrometer. The magnesias of the present invention retain in part the crystal structure of the hydroxide from which they are produced and hence they may be referred to either loosely as being, or partly being pseudomorphic of magnesium hydroxide.

A very satisfactory source of precipitated magnesium hydroxide for use in the present invention is that obtained by the process of the M. G. Mastin Patent Number 2,124,002 wherein a sea water magnesium hydroxide slurry is produced.

*Example 1*

Precipitated magnesium hydroxide obtained from sea water bittern by the process of the Mastin patent hereinbefore mentioned was burned to a maximum temperature of from 1200° to 1300° C. until partial sintering of the magnesia crystallites occurred. A magnesia product was obtained having when powdered a bulk density of 75 to 100 pounds per cu. ft. This material possessed a low chemical activity and a low ignition loss averaging about .2%.

Thereupon the medium burned magnesia obtained was hydrated (to 99%) by heating the same under steam pressure of 105 p. s. i. for four hours at 170° C.

This hydrated product was then subjected to a light burning treatment at a temperature reaching 600° to 700° C. until a product was obtained having an iodine number of about 23 and a bulk density when powdered of from 40 to 50 pounds per cu. ft. In a contraction test of the above obtained material, a gross contraction of 0.14% was observed, whereas normal or single burned sea water magnesia exhibits a gross contraction of 0.5 to 0.7%. The contraction of this novel magnesia is even less than that of typical magnesite-based oxychloride magnesias which exhibit a total contraction of 0.2 to 0.3%. Total or gross contraction is determined according to the methods of the Oxychloride Cement Association and is a measure of the total linear contraction which occurs after wet-mixing the ingredients and up to the point of maximum contraction. Gross contraction is thus always greater in magnitude than nonplastic contraction, the latter, however, being more critical with respect to cracking of cement installations.

When this same precipitated magnesium hydroxide initial material is treated by a single light burning instead of by the double burning process of the present invention, a product is obtained on grinding having a bulk density of 25 to 35 pounds per cu. ft. and it possesses a moderate chemical activity indicated by an iodine number of from 14 to 29. When this single burned material was tested for contraction after final set, the amount was 0.246% as compared with 0.085%, the latter being the amount of contraction of the ground product obtained above in the double burning operation.

Example 2

A magnesium hydroxide precipitate obtained from sea water bittern was hard burned in several test runs until dense products were obtained showing essentially no shrinkage on further firing. The bulk densities of the products obtained were of the order of 90 to 125 pounds per cu. ft. These burned products were then ground to minus 200 mesh and hydrated at 170° C. under a steam pressure of 130 p. s. i. for 14 hours. If this product is burned at 650° C. for a period of eight hours in a muffle furnace, a light burned magnesia is obtained meeting the activity requirements as to oxychloride cement compounds of Oxychloride Cement Association standards.

A number of samples of hard burned, rehydrated and light burned products of the present invention were tested for total contraction and found to show 0.11% to 0.14%.

It should be understood that the present invention is not limited to the exact details of operation herein disclosed but that it extends to all equivalents which will occur to those skilled in the art upon consideration of the scope of the claims appended hereto.

I claim:

1. A process for producing magnesias of magnesium oxychloride cement grade from magnesium hydroxide precipitated from sea water bittern which comprises burning said magnesium hydroxide precipitate at a high temperature of from about 1200° to 1800° C. until sintering has commenced, thereafter hydrating the sintered magnesia obtained and finally light burning the resulting hydrated mass at a temperature between about 600° and 900° C. to provide active magnesia of magnesium oxychloride grade.

2. A method for producing active magnesias possessing low contraction properties in magnesium oxychloride cementations from precipitated magnesium hydroxide which comprises, medium burning precipitated magnesium hydroxide at a temperature between about 1200° and 1400° C. until sintering has commenced, hydrating the medium burned magnesia obtained and light burning the resulting hydrated mass at a temperature between about 400° and 1000° C. thereby producing active magnesia having such properties.

3. A method for producing active magnesias of improved properties which comprises medium to hard burning precipitated magnesium hydroxide at a temperature above about 1200° C. to a bulk density in excess of about 50 pounds/cu. ft., hydrating the resulting burned magnesia and then light burning the resulting hydrated mass at a temperature between about 400° and 1000° C. to produce an active magnesia having a bulk density of from 38 to 50 pounds/cu. ft.

4. A method for producing active magnesias of high density suitable for magnesium oxychloride cement production which comprises, medium burning magnesium hydroxide derived by precipitation from sea water bittern at a temperature between about 1200° and 1400° C. until sintering has commenced which substantially completely removes the chlorides present and provides magnesia having a bulk density in excess of about 50 pounds per cubic foot, hydrating the medium burned magnesia obtained and then light burning the resulting hydrated mass at a temperature between about 600° and 900° C. to produce magnesia of magnesium oxychloride cement grade.

5. A method for producing active magnesias of improved properties which comprises burning magnesium hydroxide precipitated from sea water bittern to a maximum temperature of from 1200 to 1400° C. until partial sintering of the magnesia crystallites has occurred, hydrating the medium burned magnesia obtained, and reburning the hydrate obtained until the temperature reaches about 700° to 800° C. and a product having an iodine number of from about 17 to 23 is obtained.

6. A method for producing active magnesias of improved properties which comprises, hydrating a medium to hard burned magnesia theretofore precipitated as magnesium hydroxide and calcined at a temperature above about 1200° C., said magnesia being at least in part in the form of fine periclase crystals observable under an optical microscope and having a bulk density in excess of about 50 pounds/cu. ft., and light burning the resulting hydrated mass at a temperature between about 400° and 1000° C. thereby producing a densified magnesia.

7. A method for producing active magnesias of improved properties which comprises, medium to hard-burning a magnesium hydroxide precipitated from sea water at a temperature above about 1200° C. up to about 1800° C. thereby to provide a magnesia which is at least partially sintered, hydrating the sintered product obtained and light burning the resulting hydrated mass at a temperature between about 400 and 1000° C. thereby producing an active densified magnesia.

8. A method for producing magnesia of magnesium oxychloride cement grade from magnesium hydroxide precipitated from sea water bittern which comprises, medium to hard burning the magnesium hydroxide precipitate at a temperature above about 1200° C. to provide a magnesium oxide having a bulk density of at least 50 pounds/cu. ft., hydrating the burned magnesium of said indicated bulk density and light burning the resulting hydrated mass at a temperature between about 400 and 1000° C. thereby producing a densified active magnesia having an iodine number of from 8 to 25.

TEYNHAM WOODWARD.

References Cited in the file of this patent

UNITED STATES PATENTS

| Number | Name | Date |
|---|---|---|
| 2,219,726 | Seaton | Oct. 29, 1940 |
| 2,281,477 | Chesny | Apr. 28, 1942 |
| 2,348,847 | Pike | May 16, 1944 |
| 2,354,584 | Elkington et al. | July 25, 1944 |
| 2,478,593 | Pike | Aug. 9, 1949 |

FOREIGN PATENTS

| Number | Country | Date |
|---|---|---|
| 547,325 | Great Britain | Aug. 24, 1942 |
| 549,492 | Great Britain | Nov. 24, 1942 |